US008929332B2

(12) United States Patent
Sundarraman et al.

(10) Patent No.: US 8,929,332 B2
(45) Date of Patent: Jan. 6, 2015

(54) SYSTEM AND METHOD FOR HANDOFF FROM A MACRO ACCESS NETWORK TO A FEMTO ACCESS POINT

(75) Inventors: Chandrasekhar T. Sundarraman, San Diego, CA (US); Haipeng Jin, Carlsbad, CA (US); John W. Nasielski, San Diego, CA (US); Peerapol Tinnakornsrisuphap, San Diego, CA (US); Jun Wang, La Jolla, CA (US); Arungundram C. Mahendran, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 374 days.

(21) Appl. No.: 12/544,884

(22) Filed: Aug. 20, 2009

(65) Prior Publication Data

US 2010/0048216 A1 Feb. 25, 2010

Related U.S. Application Data

(60) Provisional application No. 61/091,318, filed on Aug. 22, 2008.

(51) Int. Cl.
*H04W 4/00* (2009.01)
*H04L 29/06* (2006.01)
*H04W 36/00* (2009.01)
*H04W 80/10* (2009.01)

(52) U.S. Cl.
CPC ....... *H04L 65/1006* (2013.01); *H04W 36/0011* (2013.01); *H04W 80/10* (2013.01); *H04L 65/1016* (2013.01)
USPC .......................................... 370/331; 455/444

(58) Field of Classification Search
None
See application file for complete search history.

(56) References Cited

U.S. PATENT DOCUMENTS

| 7,145,890 | B1 | 12/2006 | Seo et al. |
| 2006/0256752 | A1 | 11/2006 | Svensson et al. |
| 2007/0097939 | A1 | 5/2007 | Nylander et al. |
| 2007/0232312 | A1 | 10/2007 | Gallagher et al. |

(Continued)

FOREIGN PATENT DOCUMENTS

| CN | 1322419 A | 11/2001 |
| CN | 1606740 A | 4/2005 |

(Continued)

OTHER PUBLICATIONS

The 11th International Conference on Advanced Communication Technology, "Handover between macrocell and femtocell for UMTS based networks," 2009, vol. 1, pp. 237-241.

(Continued)

Primary Examiner — Mohammad Adhami
(74) Attorney, Agent, or Firm — Jia J. Wu

(57) ABSTRACT

Devices and methods are provided for handing off an access terminal from a macro base station to a femto access point (AP). In one embodiment, the method involves receiving a facilities directive or the like from a communication network entity, such as, for example, a serving mobile switching center (MSC). The method may involve selecting the femto AP based at least in part on femto configuration information, which may include at least one global identifier of the femto AP. The method may involve determining a uniform resource identifier of the femto AP based at least in part on at least one global identifier (e.g., MSC identifier and/or cell identifier).

61 Claims, 10 Drawing Sheets

(56) References Cited

U.S. PATENT DOCUMENTS

| | | |
|---|---|---|
| 2008/0039086 A1 | 2/2008 | Gallagher et al. |
| 2008/0170548 A1 | 7/2008 | Suh et al. |
| 2008/0305801 A1* | 12/2008 | Burgess et al. ............... 455/444 |
| 2009/0052395 A1 | 2/2009 | Bao et al. |
| 2009/0061924 A1* | 3/2009 | Morrill et al. ............. 455/552.1 |
| 2009/0067417 A1* | 3/2009 | Kalavade et al. ............. 370/356 |
| 2009/0070469 A1* | 3/2009 | Roach et al. ................... 709/226 |
| 2009/0097451 A1 | 4/2009 | Gogic |
| 2009/0129263 A1 | 5/2009 | Osborn |
| 2009/0129336 A1* | 5/2009 | Osborn ......................... 370/331 |
| 2009/0129341 A1 | 5/2009 | Balasubramanian et al. |
| 2009/0129348 A1 | 5/2009 | Osborn |
| 2009/0129349 A1 | 5/2009 | Osborn |
| 2009/0131016 A1 | 5/2009 | Osborn |
| 2009/0131017 A1 | 5/2009 | Osborn |
| 2009/0131018 A1 | 5/2009 | Osborn |
| 2009/0131024 A1 | 5/2009 | Osborn |
| 2009/0131029 A1 | 5/2009 | Osborn |
| 2009/0131049 A1 | 5/2009 | Osborn |
| 2009/0131050 A1 | 5/2009 | Osborn |
| 2009/0131062 A1 | 5/2009 | Osborn |
| 2009/0131086 A1 | 5/2009 | Osborn |
| 2009/0168726 A1* | 7/2009 | Thalanany et al. ........... 370/332 |
| 2010/0008259 A1* | 1/2010 | Yoon et al. ................... 370/254 |
| 2010/0150110 A1* | 6/2010 | Dutta et al. ................... 370/331 |
| 2010/0157941 A1* | 6/2010 | Raghothaman et al. ...... 370/331 |

FOREIGN PATENT DOCUMENTS

| | | |
|---|---|---|
| CN | 1794068 A | 6/2006 |
| WO | WO-9107020 A1 | 5/1991 |
| WO | WO-0111804 A1 | 2/2001 |
| WO | WO2005099185 A1 | 10/2005 |
| WO | 2009026036 | 2/2009 |
| WO | 2009049032 | 4/2009 |
| WO | 2009067700 | 5/2009 |

OTHER PUBLICATIONS

IEEE Sarnoff Symposium, "On the Reverse Link Capacity of a CDMA Network of Femto-cells," 2008, pp. 1-5.

3GPP2: "3GPP2 X.S0004-200-E Mobile Application Part (MAP)—Intersystem Handoff", 3GPP2, [Online] May 1, 2006, XP002560642, Retrieved from the Internet : URL: http://www.3gpp2.org/Public_html/specs/X.S0004-200-E_v1.0-060502.pdf> [retrieved on Dec. 16, 2009].

"Digital cellular telecommunications system (Phase 2+) ; Generic Access Network (GAN); Stage 2 (3GPP TS 43.318 version 7.5.0 Release 7); ETSI TS 143 318", Jul. 1, 2008, ETSI Standard, European Telecommunications Standards Institute (ETSI) , Sophia Antipolis Cedex , France , XP014042197 p. 40, paragraph 8.14-p. 47, paragraph 8.15 figures 26-28,26b.

International Search Report and Written Opinion—PCT/US2009/054690—ISA/EPO—Jan. 7, 2010.

Kineto: "UMA: The 3GPP standard for femtocell-to-Core Network connectivity", Internet citation, Aug. 1, 2007, pp. 1-9, XP002497655 USA [retrieved on Aug. 1, 2007].

Dennisong et al., Femtocell mobility needs, 3GPP2 FEMTO Cell Workshop, S00-FEMTO-20070915-007, Oct. 2007, pp. 15-16.

Sundarraman, C., et al., "Stage 2 call flows for 1x Femto/IMS Handoffs", X30-20080825-008, Aug. 25, 2008.

Taiwan Search Report—TW098128425—TIPO—Jan. 15, 2013.

Tatara Systems: "SIP Based Architecture for Integration of 1xRTT Femtocells", Internet Citation Oct. 13, 2007, pp. 1-26, XP002539795 Retrieved from the Internet: URL:ftp://ftp.3gpp2.org/TSGS/Working/_2007/2007-10-Fenito_Cell_Workshop-Books.

* cited by examiner

SYSTEM AND METHOD FOR HANDOFF FROM A MACRO ACCESS NETWORK TO A FEMTO ACCESS POINT

CLAIM OF PRIORITY UNDER 35 U.S.C. §119

The present application for patent claims priority to Provisional Application No. 61/091,318 entitled "SYSTEM AND METHOD TO IDENTIFY AND CONTACT A FEMTO ACCESS POINT DURING 1X CDMA2000 HANDOFF FROM A MACRO ACCESS NETWORK TO THE FEMTO ACCESS POINT," filed Aug. 22, 2008, and assigned to the assignee hereof and hereby expressly incorporated by reference herein.

BACKGROUND

1. Field

The present application relates generally to wireless communications, and more specifically to methods and systems for handing off an access terminal to a femto access point.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3GPP Long Term Evolution (LTE) systems, and Orthogonal Frequency Division Multiple Access (OFDMA) systems.

Generally, a wireless multiple-access communication system may simultaneously support communication for multiple wireless terminals. Each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a Multiple-In-Multiple-Out (MIMO) system.

A new class of small base stations has emerged, which may be installed in a user's home and provide indoor wireless coverage to mobile units using existing broadband Internet connections. Such a base station is generally known as an Access Point (AP) base station, but may also be referred to as Home Node B (HNB) unit, Home evolved Node B unit (HeNB), femto cell, femto Base Station (fBS), base station, or base station transceiver system. Typically, the AP base station is connected to the Internet and the mobile operator's network via a Digital Subscriber Line (DSL), cable internet access, T1/T3, or the like, and offers typical base station functionality, such as Base Transceiver Station (BTS) technology, radio network controller, and gateway support node services. This allows an Access Terminal (AT), also referred to as a cellular/mobile device or handset, or User Equipment (UE), to connect to the AP base station and utilize the wireless service. ATs can include, for example, cellular phones, smart phones, laptops, handheld communication devices, handheld computing devices, satellite radios, navigational devices, Personal Digital Assistants (PDAs), or any other suitable device for communicating over a wireless communication system.

In a heterogeneous wireless access environment that includes both macro base stations and femto base stations, it is imperative that ATs are handed off from macro base stations to femto base stations in a seamless manner. However, scalability issues arise when there is mass deployment of femto AP base stations in a given area. In addition, femto cell pilot pseudo-noise offset ambiguity issues arise during macro to femto handoffs when the AT is in active mode. Accordingly, there is a need for an improved method and system for active handoff of an AT from a macro base station to AP base station that optimizes resource utilization and the end-user experience.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with a method for handing off an AT from a macro base station to a femto AP, such as when the AT is in active mode. For example, the method may involve receiving a handoff message/stimulus (e.g., facilities directive, handoff back, and/or handoff-to-third messages) from an Internet Protocol Multimedia Subsystem (IMS) entity (e.g., a serving mobile switching center) in operative communication with the macro base station. For example, the handoff message may include femto configuration information (e.g., a pseudo-noise offset for the femto AP, a source macro cell identifier, pilot signal strength measurements for neighboring femto APs, etc.).

The method may involve selecting the femto AP from a plurality of femto APs based at least in part on the femto configuration information. For example, the femto configuration information may comprise at least one global identifier of the selected femto AP. The at least one global identifier of the femto AP may comprise one or more of an MSC identifier, a cell identifier, a machine-readable address, a text string, geo-location data, etc.

The method may involve determining a Session Initiation Protocol (SIP) Uniform Resource Identifier (URI) of the femto AP based at least in part on the at least one global identifier. The method may involve using the SIP URI to transmit a SIP message to the femto AP (e.g., such as via an intermediate entity). The intermediate entity may include a Call Session Control Function (CSCF) or the like. The SIP message may comprise a handoff request.

The method may involve, in response to receiving a SIP message acknowledgement from the femto AP, establishing a backhaul bearer for the femto AP (e.g., between the femto AP and a media gateway). Receiving the SIP message acknowledgement may comprise receiving a handoff request acknowledgement and/or SDP information of the femto AP. The method may involve sending a handoff message response to the IMS entity, thereby resulting in handoff of the AT to the femto AP. The method may further involve provisioning registration of each of the plurality of femto APs with an IMS and/or a femto convergence server (FCS). It is believed the active handoff methodology described herein will support legacy ATs and involve minimal changes to legacy networks.

In accordance with one or more embodiments and corresponding disclosure thereof, various aspects are described in connection with devices and apparatuses for handing off an AT from a macro base station to a femto AP. For example, the apparatus may include a means for receiving a handoff message/stimulus from an IMS entity in operative communication with the macro base station, the handoff message comprising femto configuration information. The apparatus may include: a means for selecting the femto AP from a plurality of femto APs based at least in part on the femto configuration information; a means for determining a SIP URI of the femto AP based at least in part on the at least one global identifier or the like; and a means for using the SIP URI to transmit a SIP message to the femto AP. The apparatus may include: a means for establishing a backhaul bearer for the femto AP in response to receiving a SIP message acknowledgement from the femto AP; and a means for sending a handoff message response to the IMS entity.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
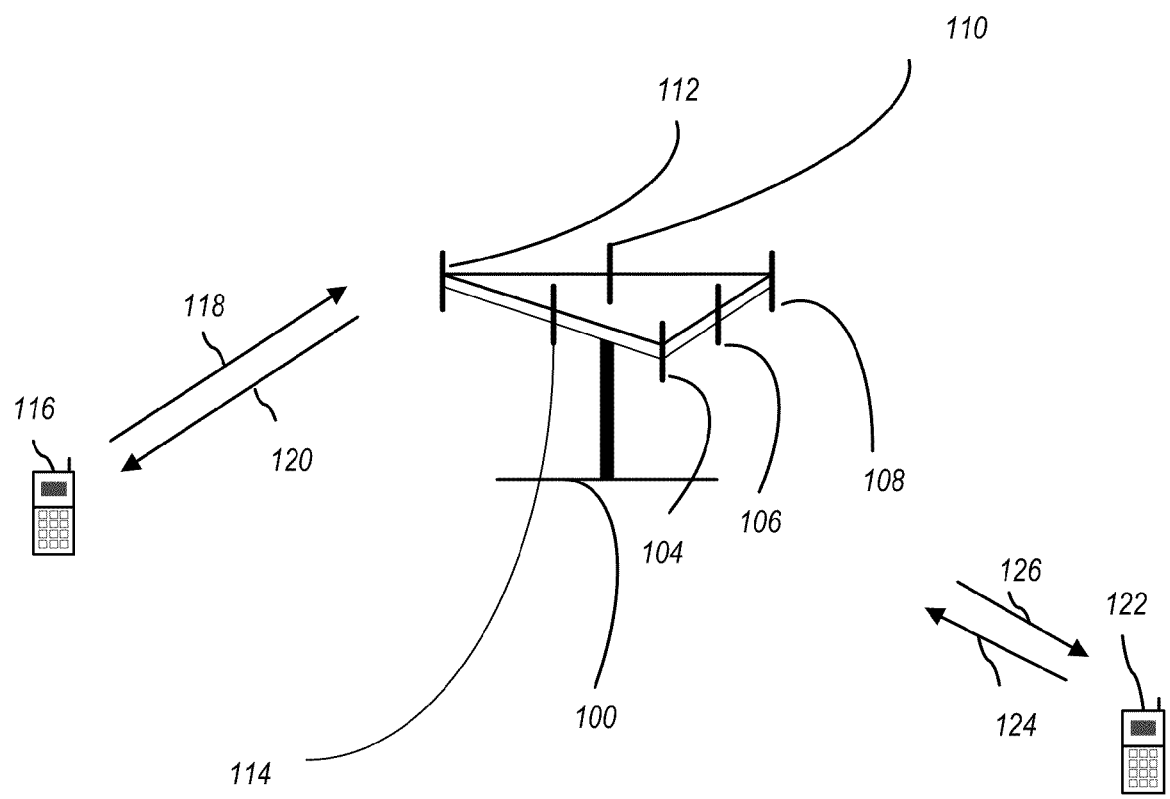
FIG. 1 illustrates a multiple access wireless communication system according to one embodiment.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

SC-FDMA systems utilize single carrier modulation and frequency domain equalization, and may have similar performance and essentially the same overall complexity as those of OFDMA systems. A SC-FDMA signal generally has lower Peak-to-Average Power Ratio (PAPR) because of its inherent single carrier structure. SC-FDMA has drawn great attention, especially for uplink communications where lower PAPR greatly benefits the mobile terminal in terms of transmit power efficiency, and is currently a working assumption for uplink multiple access schemes in 3GPP LTE or Evolved UTRA. For the purposes of the present document, the following abbreviations apply:

AM Acknowledged Mode
AMD Acknowledged Mode Data
ARQ Automatic Repeat Request
BCCH Broadcast Control Channel
BCH Broadcast Channel
CCCH Common Control Channel
CCH Control Channel
CCTrCH Coded Composite Transport Channel
CP Cyclic Prefix
CRC Cyclic Redundancy Check
CTCH Common Traffic Channel
DCCH Dedicated Control Channel
DCH Dedicated Channel
DL Downlink
DL-SCH Downlink Shared Channel
DSCH Downlink Shared Channel
DTCH Dedicated Traffic Channel
FACH Forward link Access Channel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MBSFN Multicast Broadcast Single Frequency Network
MCE MBMS Coordinating Entity
MCH Multicast Channel
MRW Move Receiving Window
MSB Most Significant Bit
MSCH MBMS point-to-multipoint Scheduling Channel
MTCH MBMS point-to-multipoint Traffic Channel
PCCH Paging Control Channel PCH Paging Channel
PDCCH Physical Downlink Control Channel
PDSCH Physical Downlink Shared Channel
PDU Protocol Data Unit
PHY Physical layer
PhyCH Physical Channel
RACH Random Access Channel
RLC Radio Link Control
RRC Radio Resource Control
SAP Service Access Point
SDU Service Data Unit
SHCCH Shared channel Control Channel
SN Sequence Number
SUFI Super Field
TCH Traffic Channel
TDD Time Division Duplex
TFI Transport Format Indicator
TM Transparent Mode
TMD Transparent Mode Data
TTI Transmission Time Interval
UE User Equipment
UL Uplink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the AP. In the embodiment, antenna groups each are designed to communicate to access terminals in a sector of the areas covered by AP 100. In communication over forward links 120 and 126, the transmitting antennas of AP 100 utilize beam-forming in order to improve the signal-to-noise ratio of forward links for the different access terminals 116 and 124. Also, an AP using beamforming to transmit to access terminals scattered randomly through its coverage causes less interference to access terminals in neighboring cells than an AP transmitting through a single antenna to all its access terminals.

In accordance with aspects of the embodiments described herein, there is provided a multiple-in-multiple-out (MIMO) system that employs multiple (NT) transmit antennas and multiple (NR) receive antennas for data transmission. A MIMO channel formed by the NT transmit and NR receive antennas may be decomposed into NS independent channels, which are also referred to as spatial channels, where NS≤min {NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 2:
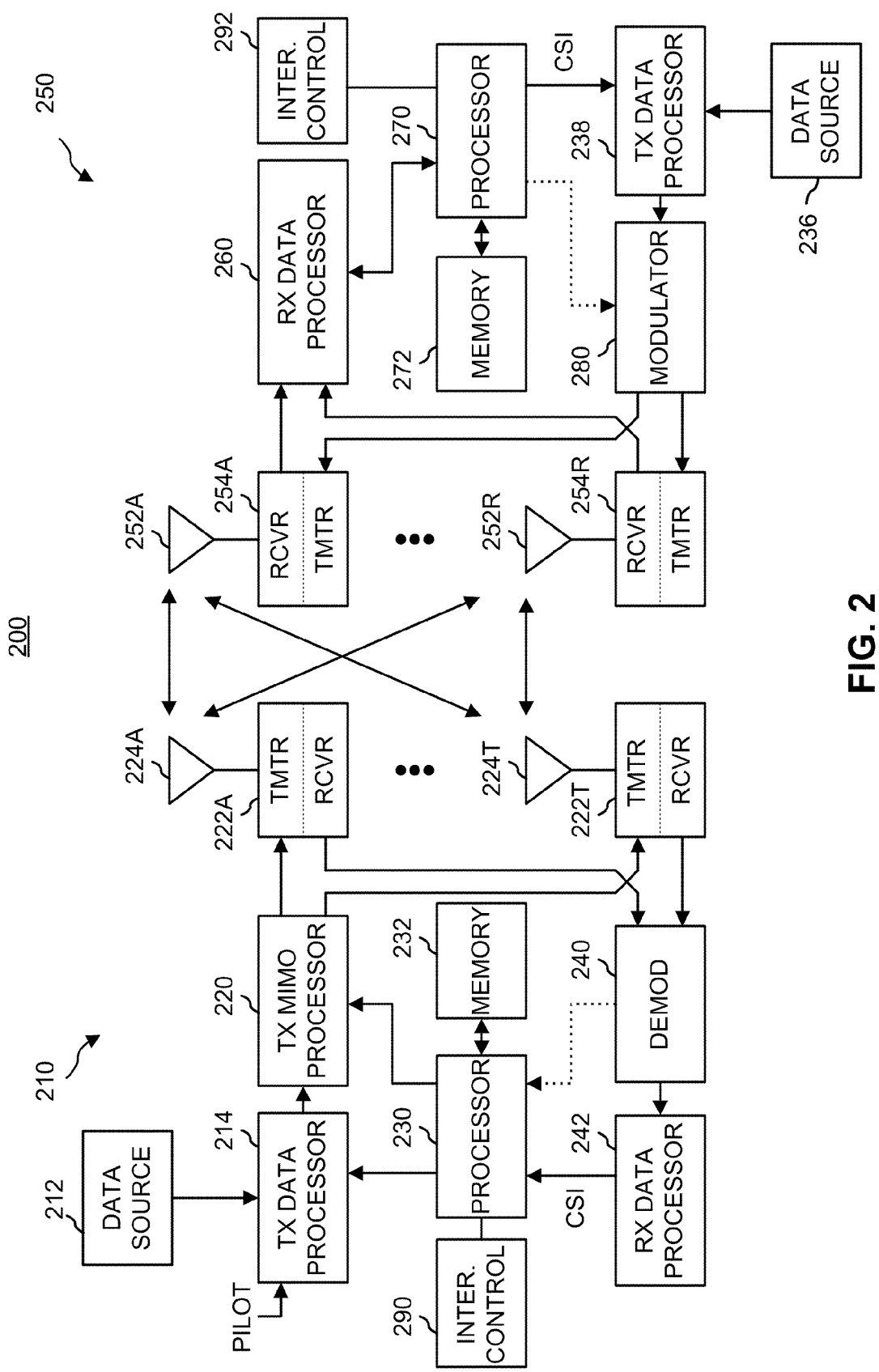
FIG. 2 illustrates a block diagram of a communication system.

The teachings herein may be incorporated into a node (e.g., a device) employing various components for communicating with at least one other node. FIG. 2 depicts several sample components that may be employed to facilitate communication between nodes. Specifically, FIG. 2 illustrates a wireless device 210 (e.g., an access point) and a wireless device 250 (e.g., an access terminal) of a MIMO system 200. At the device 210, traffic data for a number of data streams is provided from a data source 212 to a transmit ("TX") data processor 214.

In some aspects, each data stream is transmitted over a respective transmit antenna. The TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., Binary Phase Shift Keying (BPSK), Quadrature Phase-Shift Keying (QPSK), M-ary Phase Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 230. A data memory 232 may store program code, data, and other information used by the processor 230 or other components of the device 210.

The modulation symbols for all data streams are then provided to a TX MIMO processor 220, which may further process the modulation symbols (e.g., for OFDM). The TX MIMO processor 220 then provides $N_T$ modulation symbol streams to $N_T$ transceivers ("XCVR") 222A through 222T. In some aspects, the TX MIMO processor 220 applies beam-forming weights to the symbols of the data streams and to the antenna from which the symbol is being transmitted.

Each transceiver 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 222A through 222T are then transmitted from $N_T$ antennas 224A through 224T, respectively.

At the device 250, the transmitted modulated signals are received by NR antennas 252A through 252R and the received signal from each antenna 252 is provided to a respective transceiver ("XCVR") 254A through 254R. Each transceiver 254 conditions (e.g., filters, amplifies, and downconverts) a respective received signal, digitizes the conditioned signal to provide samples, and further processes the samples to provide a corresponding "received" symbol stream.

A receive ("RX") data processor 260 then receives and processes the NR received symbol streams from NR transceivers 254 based on a particular receiver processing technique to provide $N_T$ "detected" symbol streams. The RX data processor 260 then demodulates, deinterleaves, and decodes each detected symbol stream to recover the traffic data for the data stream. The processing by the RX data processor 260 is complementary to that performed by the TX MIMO processor 220 and the TX data processor 214 at the device 210.

A processor 270 periodically determines which pre-coding matrix to use (discussed below). The processor 270 formulates a reverse link message comprising a matrix index portion and a rank value portion. A data memory 272 may store program code, data, and other information used by the processor 270 or other components of the device 250.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by the transceivers 254A through 254R, and transmitted back to the device 210.

At the device 210, the modulated signals from the device 250 are received by the antennas 224, conditioned by the transceivers 222, demodulated by a demodulator ("DEMOD") 240, and processed by a RX data processor 242 to extract the reverse link message transmitted by the device 250. The processor 230 then determines which pre-coding matrix to use for determining the beam-forming weights then processes the extracted message.

FIG. 2 also illustrates that the communication components may include one or more components that perform interference control operations as taught herein. For example, an interference ("INTER.") control component 290 may cooperate with the processor 230 and/or other components of the device 210 to send/receive signals to/from another device (e.g., device 250) as taught herein. Similarly, an interference control component 292 may cooperate with the processor 270 and/or other components of the device 250 to send/receive signals to/from another device (e.g., device 210). It should be appreciated that for each device 210 and 250 the functionality of two or more of the described components may be provided by a single component. For example, a single processing component may provide the functionality of the interference control component 290 and the processor 230 and a single processing component may provide the functionality of the interference control component 292 and the processor 270.

In accordance with one aspect of the embodiments described herein, logical channels may be classified into Logical Control Channels and Logical Traffic Channels. The Logical Control Channels may comprise: a BCCH which is a DL channel for broadcasting system control information; a PCCH which is a DL channel that transfers paging information; and/or a MBMS point-to-multipoint Control Channel which is a point-to-multipoint DL channel used for transmitting MBMS scheduling and control information for one or several MTCHs. Generally, after establishing an RRC connection this channel is used by ATs that receive MBMS. In the alternative, or in addition, the Logical Control Channels may comprise DCCH which is a point-to-point bi-directional channel that transmits dedicated control information, and may be used by ATs having an RRC connection. In accordance with another aspect of the embodiments described herein, the Logical Traffic Channels may comprise: a DTCH which is a point-to-point bi-directional channel, dedicated to one AT for the transfer of user information; and/or a MTCH which is a point-to-multipoint DL channel for transmitting traffic data.

In accordance with one aspect, Transport Channels may be classified into DL and UL. The DL Transport Channels may comprise: a BCH, a Downlink Shared Data Channel (DL-SDCH) and a PCH, the PCH for support of AT power saving (DRX cycle is indicated by the network to the AT), broadcasted over entire cell and mapped to PHY resources which can be used for other control/traffic channels. The UL Transport Channels may comprise a RACH, a Request Channel (REQCH), an Uplink Shared Data Channel (UL-SDCH), and/or a plurality of PHY channels. The PHY channels may comprise a set of DL channels and UL channels.

The DL PHY channels may comprise: a Common Pilot Channel (CPICH); Synchronization Channel (SCH); a CCCH; a Shared DL Control Channel (SDCCH); a Multicast Control Channel; a Shared UL Assignment Channel (SUACH); an Acknowledgement Channel (ACKCH); a DL Physical Shared Data Channel (DL-PSDCH); an UL Power Control Channel (UPCCH); a Paging Indicator Channel (PICH); and/or a Load Indicator Channel (LICH).

The UL PHY channels may comprise: a Physical Random Access Channel (PRACH); a Channel Quality Indicator Channel (CQICH); an ACKCH; an Antenna Subset Indicator Channel (ASICH); a Shared Request Channel (SREQCH); an UL Physical Shared Data Channel (UL-PSDCH); and/or a Broadband Pilot Channel (BPICH).

In related aspects, a channel structure is provided that preserves low Peak-to-Average Power Ratio (PAR) (at any given time, the channel is contiguous or uniformly spaced in frequency) properties of a single carrier waveform.

In some aspects, the teachings herein may be employed in a network that includes macro scale coverage (e.g., a large area cellular network such as a 3G networks, typically referred to as a macro cell network) and smaller scale coverage (e.g., a residence-based or building-based network environment). As an AT moves through such a network, the AT may be served in certain locations by access nodes (ANs) that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, evolved Node B (eNodeB), macro cell, and so on. Also, a femto node may be configured or referred to as a Home Node B (HNB), Home evolved Node B (HeNodeB), AP base station, femto cell, femto access point (femto AP), and so on.

Figure 3A:
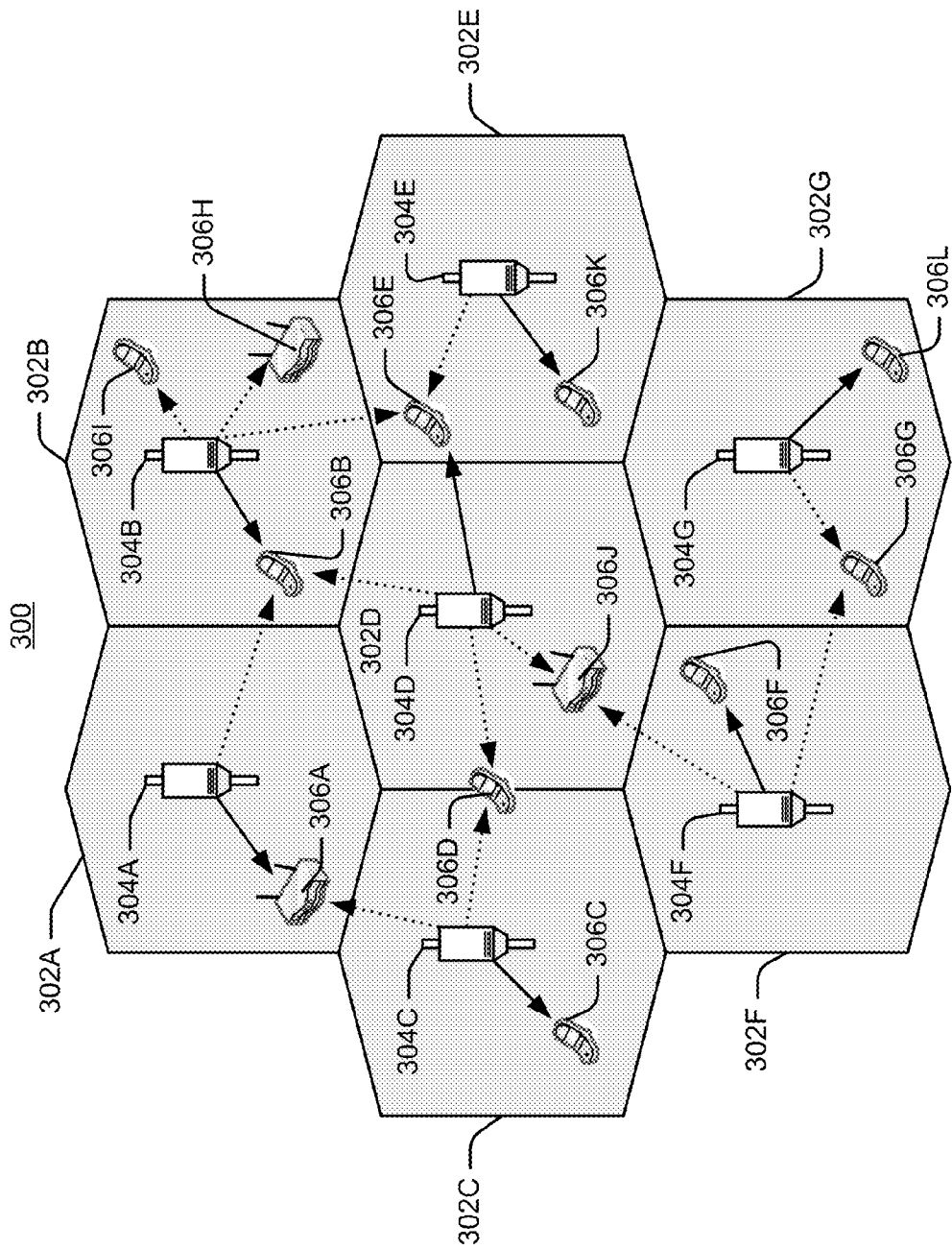
FIGS. 3A-C illustrate aspects of deployment of access point base stations within a network environment.

FIG. 3A illustrates a wireless communication system 300, configured to support a number of users, in which the teachings herein may be implemented. The system 300 provides communication for multiple cells 302, such as, for example, macro cells 302A-302G, with each cell being serviced by a corresponding access node 304 (e.g., access nodes 304A-304G). As shown in FIG. 3, access terminals 306 (e.g., access terminals 306A-306L) may be dispersed at various locations throughout the system over time. Each access terminal 306 may communicate with one or more access nodes 304 on a forward link and/or a reverse link at a given moment, depending upon whether the access terminal 306 is active and whether it is in soft handoff, for example. The wireless communication system 300 may provide service over a large geographic region. For example, macro cells 302A-302G may cover a few blocks in a neighborhood.

Figure 3B:
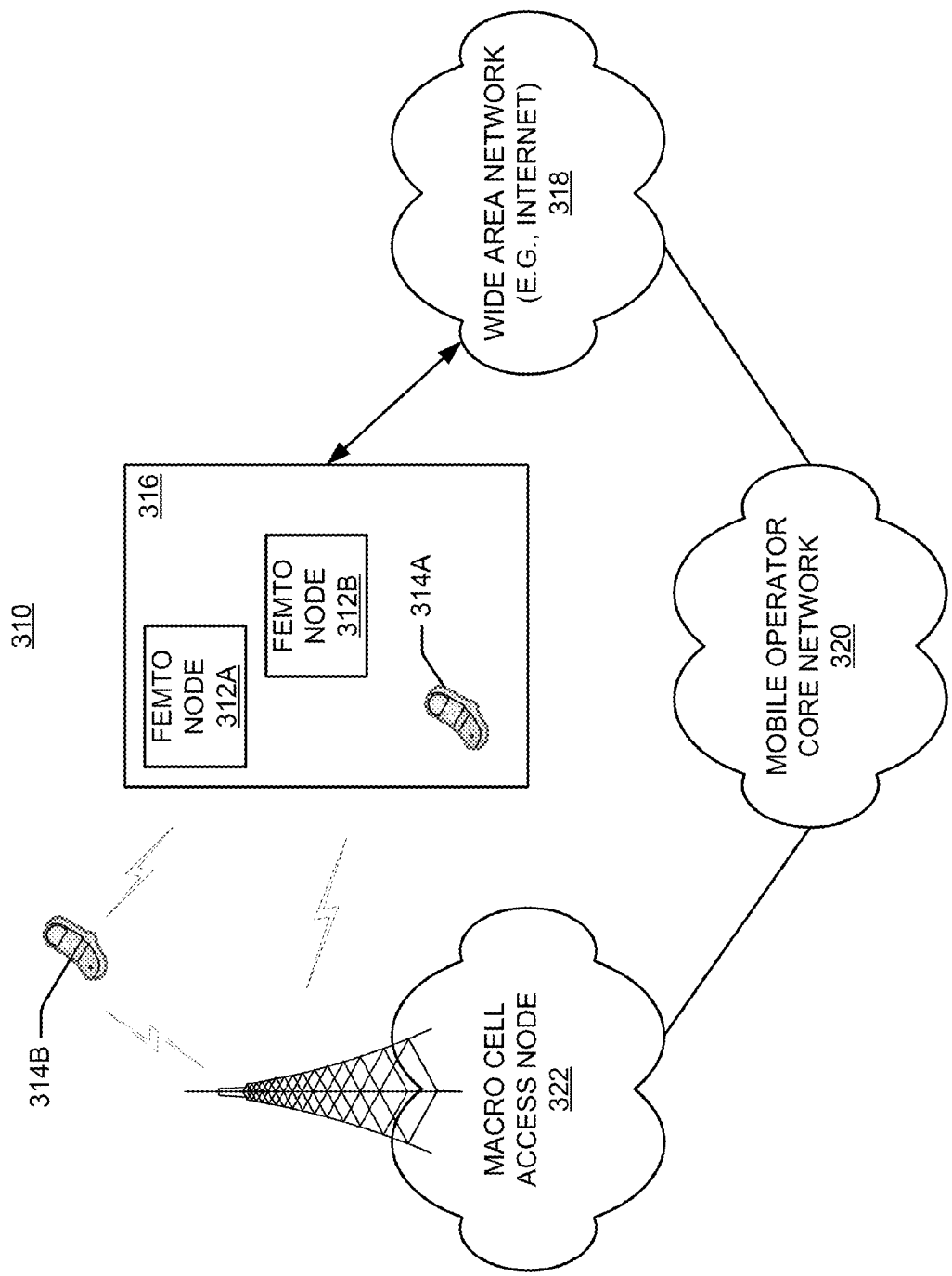

FIG. 3B illustrates an exemplary communication system 310 where one or more femto nodes are deployed within a network environment. Specifically, the system 310 includes multiple femto nodes 312 (e.g., femto nodes 312A and 312B) installed in a relatively small scale network environment (e.g., in one or more user residences 316). Each femto node 312 may be coupled to a wide area network 318 (e.g., the Internet) and a mobile operator core network 320 via a DSL router, a cable modem, a wireless link, or other connectivity means (not shown). As will be discussed below, each femto node 312 may be configured to serve associated access terminals 314 (e.g., access terminal 314A) and, optionally, alien access terminals 314 (e.g., access terminal 314B). In other words, access to femto nodes 312 may be restricted whereby a given access terminal 314 may be served by a set of designated (e.g., home) femto node(s) 312 but may not be served by any non-designated femto nodes 312 (e.g., a neighbor's femto node 312).

Figure 3C:
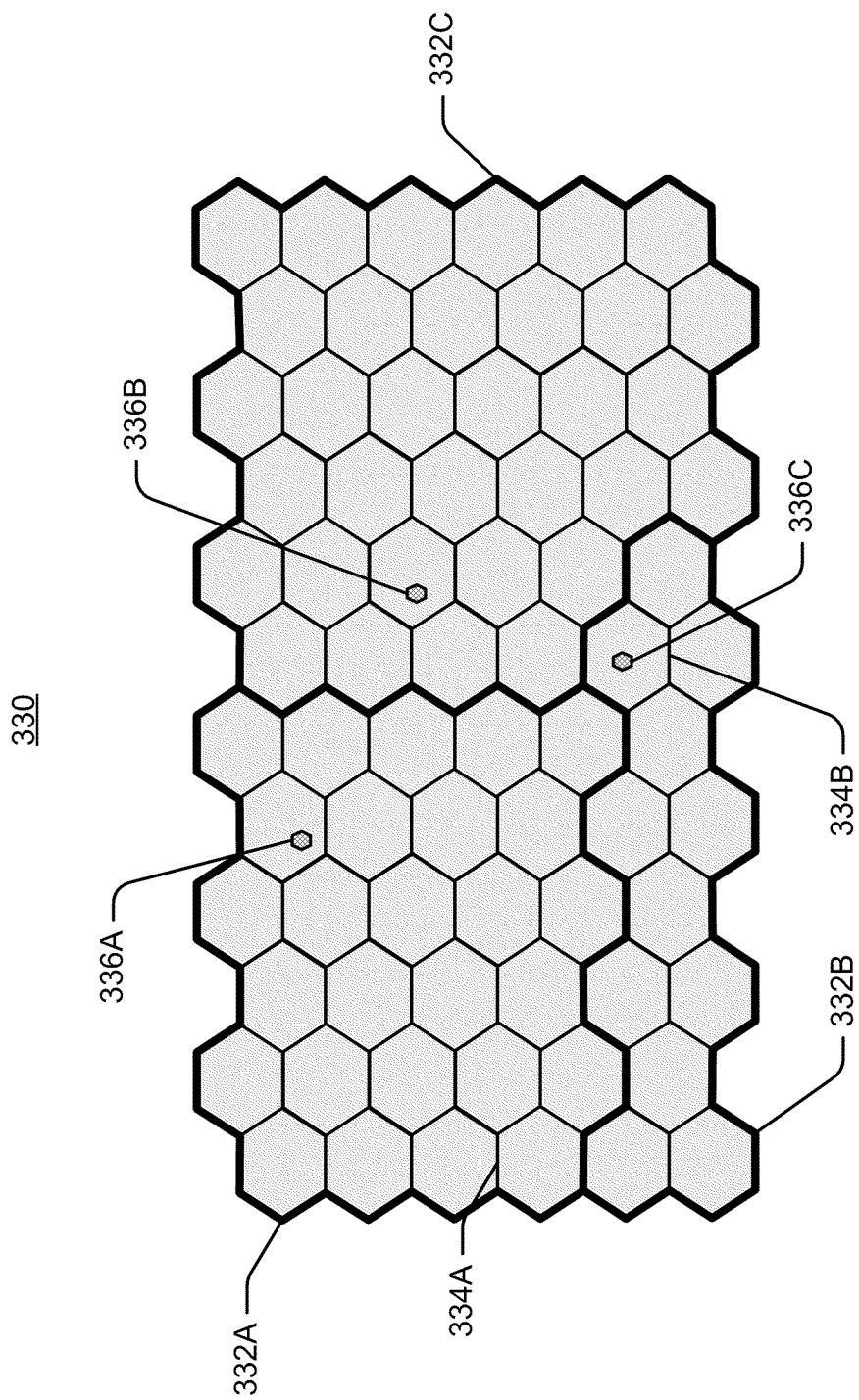

FIG. 3C illustrates an example of a coverage map 330 where several tracking areas 332 (or routing areas or location areas) are defined, each of which includes several macro coverage areas 334. Here, areas of coverage associated with tracking areas 332A, 332B, and 332C are delineated by the wide lines and the macro coverage areas 334 are represented by the hexagons. The tracking areas 332 also include femto coverage areas 336. In this example, each of the femto coverage areas 336 (e.g., femto coverage area 336C) is depicted within a macro coverage area 334 (e.g., macro coverage area 334B). It should be appreciated, however, that a femto coverage area 336 may not lie entirely within a macro coverage area 334. In practice, a large number of femto coverage areas 336 may be defined with a given tracking area 332 or macro coverage area 334. Also, one or more pico coverage areas (not shown) may be defined within a given tracking area 332 or macro coverage area 334.

Referring again to FIG. 3B, the owner of a femto node 312 may subscribe to mobile service, such as, for example, 3G mobile service, offered through the mobile operator core network 320. In addition, an access terminal 314 may be capable of operating both in macro environments and in smaller scale (e.g., residential) network environments. In other words, depending on the current location of the access terminal 314, the access terminal 314 may be served by an access node 322 of the macro cell mobile network 320 or by any one of a set of femto nodes 312 (e.g., the femto nodes 312A and 312B that reside within a corresponding user residence 316). For example, when a subscriber is outside his home, he is served by a standard macro access node (e.g., node 322) and when the subscriber is at home, he is served by a femto node (e.g., node 312A). Here, it should be appreciated that a femto node 314 may be backward compatible with existing access terminals 314.

A femto node 312 may be deployed on a single frequency or, in the alternative, on multiple frequencies. Depending on the particular configuration, the single frequency or one or more of the multiple frequencies may overlap with one or more frequencies used by a macro node (e.g., node 322).

In some aspects, an access terminal 314 may be configured to connect to a preferred femto node (e.g., the home femto node of the access terminal 314) whenever such connectivity is possible. For example, whenever the access terminal 314 is within the user's residence 316, it may be desired that the access terminal 314 communicate only with the home femto node 312.

In some aspects, if the access terminal 314 operates within the macro cellular network 320 but is not residing on its most preferred network (e.g., as defined in a preferred roaming list), the access terminal 314 may continue to search for the most preferred network (e.g., the preferred femto node 312) using a Better System Reselection ("BSR"), which may involve a periodic scanning of available systems to determine whether better systems are currently available, and subsequent efforts to associate with such preferred systems. With the acquisition entry, the access terminal 314 may limit the search for specific band and channel. For example, the search for the most preferred system may be repeated periodically. Upon discovery of a preferred femto node 312, the access terminal 314 selects the femto node 312 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 312 that reside within the corresponding user residence 316). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

In accordance with aspects of the embodiments described herein, during handoff from a 1x cdma2000 macro access network (AN) to a femto node or femto AP, a femto convergence server (FCS) of network 350 acts as a target Mobile Switching Center (MSC) in the inter-system handoff procedure. The target femto AP may be uniquely identified by its global identifier, such as, for example, an IS-41 Cell Global Identifier (ICGI) to the source MSC. The ICGI may comprise an MSC identifier and/or a cell identifier (e.g., MSC_ID, Cell_ID). The source MSC may trigger a facilities directive message (e.g., FACDIR2) to the target FCS. It would be desirable for the target FCS to identify the femto AP using a Session Initiation Protocol (SIP) address of the Femto AP. In addition, the associated Serving Call Session Control Function (S-CSCF) and Proxy Call Session Control Function (P-CSCF) also need to be identified.

In one embodiment, the S-CSCF associated with the femto AP performs a third party registration with the FCS, sometimes referred to as the Mobile Application Part (MAP) Femto Interworking Function (MFIF), on behalf of the femto AP. For example, the FCS may assign a cell identifier (e.g., MSC_ID/Cell_ID) to the femto AP and may associate the femto AP's SIP contact address and the associated S-CSCF/P-CSCF addresses with the MSC_ID/Cell_ID. In the alternative, or in addition, a femto AP SIP contact address may be derived from the MSC_ID/Cell_ID assigned to the femto AP. During handoff, the femto AP SIP contact address may now be uniquely identified by the FCS given the target cell identifier (MSC_ID/Cell_ID) of the target femto AP during the handoff.

Figure 4:
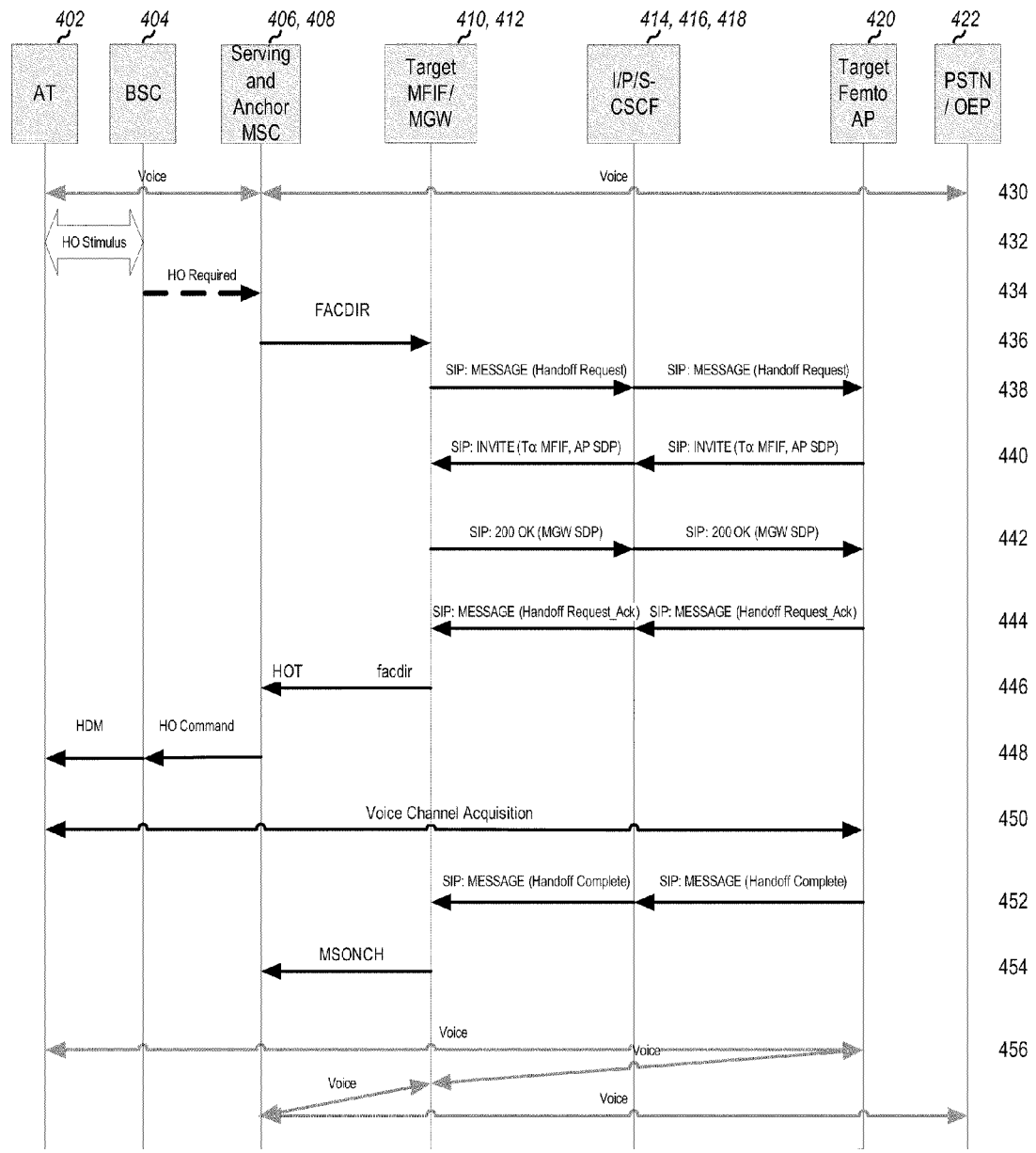
FIG. 4 illustrates a call flow diagram of a handoff procedure performed by an AT from the macro base station to a femto AP, according to one embodiment of the invention.

FIG. 4 illustrates a call flow diagram 400 of a handoff procedure performed by an AT 402 from a macro base station 404 of a macro AN to a femto AP 420, according to one embodiment of the invention. As shown in FIG. 4, the other entities depicted in the call flow diagram 400 may include: a serving Mobile Switching Center (MSC) 406 and/or an anchor MSC 408; a target FCS 410 and/or a Media Gateway (MGW) 412; an Interrogating Call Session Control Function (I-CSCF) 414 and/or P-CSCF 416 and/or S-CSCF 418; and a Public Switched Telephone Network (PSTN) 422 and/or an Other End Point (OEP) 424.

In one embodiment, at step 430, a call involving the served AT is in progress. At step 432, the serving macro base station 404 may determine if a handoff is required and may send the Handoff Required message to the serving MSC 406. At step 434, the serving MSC 406 may elect to determine if a handoff to a candidate FCS (e.g., based on the reported ICGI) is appropriate.

At step 436, the serving MSC 406 may determine that the call should be handed off to the candidate (now target) FCS 410 and that the target FCS 410 is not already on the call path. The serving MSC 406 may send a facilities directive message (e.g., FACDIR) to the target FCS 410, directing the target FCS 410 to initiate a Handoff-Forward task. If the serving MSC 406 counts tandem segments, then it may increment a segment counter or the like by one (e.g., in a BillingID parameter or the like).

At step 438, the target FCS 410 may derive the femto AP SIP address from a global identifier (e.g., ICGI) included in the facilities directive message and may look up the associated S-CSCF to send the Handoff Required message (e.g., encapsulated using a SIP message or the like). The target S-CSCF 418 may forward the SIP message to the target femto AP 420 via the P-CSCF 416.

At step 440, the femto AP 420 may verify that the AT 402 is allowed 1x cdma2000 circuit switched services through the femto AP 420 and may send an invitation (e.g., SIP_INVITE or the like) to the P-CSCF 416 and then to the S-CSCF 418. The S-CSCF 418 may forward the invitation to the FCS 410.

At step 442, the FCS 410 may request that the MGW 412 setup an ephemeral termination and send an acknowledgment (e.g., SIP_200 OK or similar acknowledgement that a SIP message has been successfully received by a given SIP end party the SIP message was meant for) along with the MGW session description protocol (SDP) to the S-CSCF 418 and P-CSCF 416. The P-CSCF 416 may forward the acknowledgment to the femto AP 420.

At step 444, upon receiving the acknowledgement (e.g., SIP_200_OK) with the MGW SDP parameters, the femto AP 420 may set up the voice Real-Time Transport Protocol (RTP) bearer path to the MGW 412 and may send to the P-CSCF 416 and S-CSCF 418 a SIP message carrying a Handoff Request acknowledgement message (e.g., Handoff_Request_Ack message or the like). The S-CSCF 418 may forward the Handoff Request acknowledgement message to the FCS 410.

At step 446, the necessary facilities on the designated target system are available. Therefore, the target FCS 410 may increase a segment counter or the like (e.g., in the received BillingID parameter) by one and may use the new BillingID or the like for the new call segment, may return a facilities directive to the requesting MSC 406, and may initiate a Handoff-Forward task.

At step 448, on receipt of the facilities directive, the serving MSC 406 may send a Mobile Handoff Order to the served AT 402. The AT 402 may be received on the designated traffic channel on the femto AP 420 (step 450). The femto AP 420 may send a SIP message carrying a Handoff Complete Message to the P-CSCF 416 and the S-CSCF 418. The S-CSCF 418 may forward the SIP message to the target FCS 410 (step 452).

At step 454, the target FCS 410 may complete the voice path between the traffic channel and the MSC-FCS trunk, and may send an MSOnChannel (MSONCH) message to the initiator of the Handoff-Forward task. The serving MSC 406, may inform the requesting system that the target FCS 410 has successfully completed the Handoff-Forward task. The serving MSC 406, on receipt of the MSONCH message, may complete the handoff process. The MSC-FCS trunk should be connected by this point, if it has not already been connected. The voice call may now be in progress through the femto AP 420 (step 456).

Figure 5:
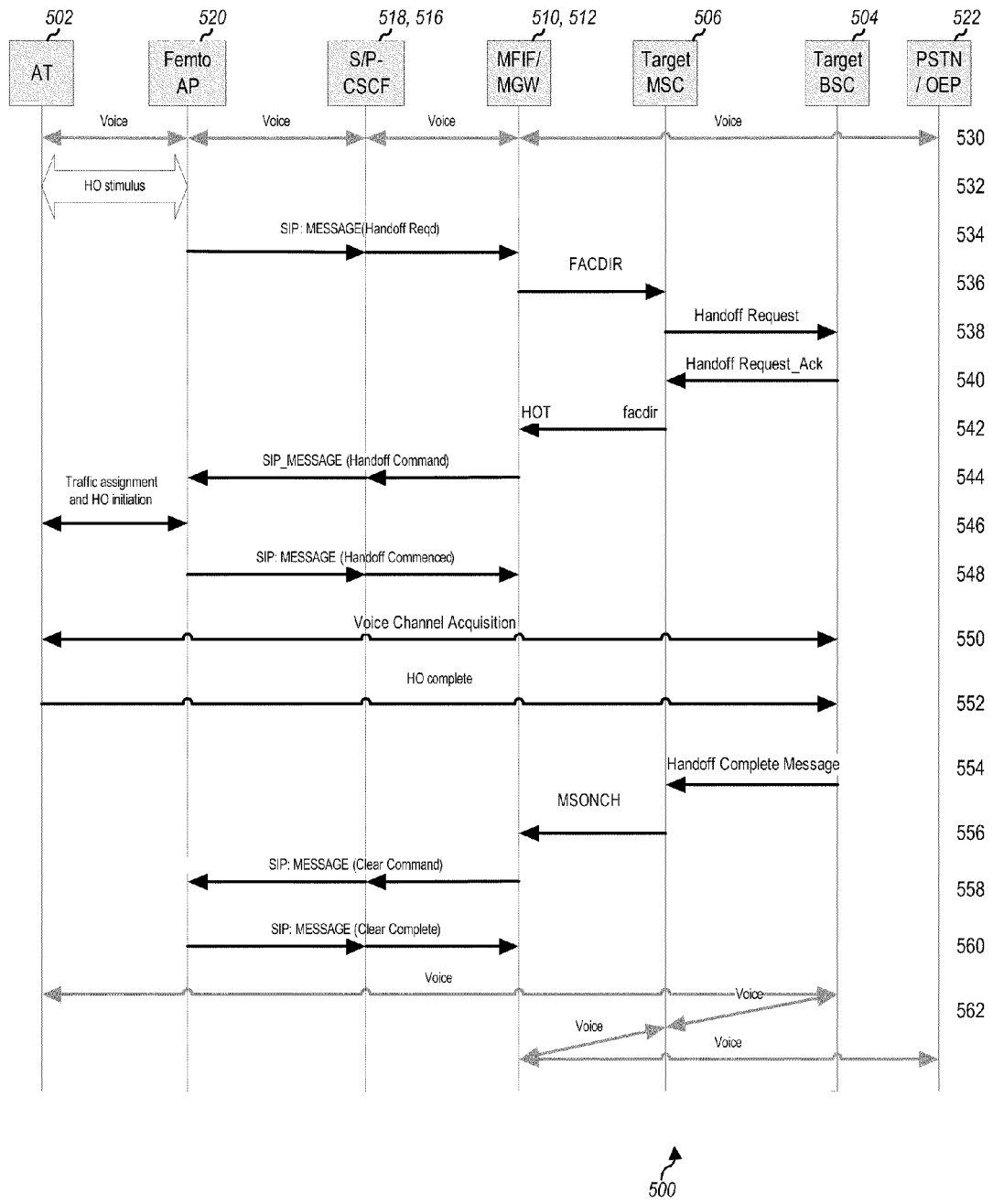
FIG. 5 illustrates a call flow diagram of a handoff procedure performed by an AT from the femto AP to a macro base station, according to one embodiment of the invention.

FIG. 5 illustrates a call flow diagram 500 of a handoff procedure performed by an AT 502 from the femto AP 520 to a target macro base station 504 of a macro AN, according to one embodiment of the invention. As shown in FIG. 5, the other entities depicted in the call flow diagram 500 may include: an S-CSCF 518 and/or a P-CSCF 516; a FCS 510 and/or a MGW 512; a target MSC 506; and a PSTN 522 and/or OEP 524.

In one embodiment, at step 530, a call involving the served AT 502 is in progress through the femto AP 520. For simplicity, it is assumed that the serving FCS 510 is the anchor FCS for the duration of the call. At step 532, the femto AP 520 may determine if a handoff is required and may verify the AN identified by the AT. At step 534, the femto AP 520 may send a SIP message carrying the Handoff Required message to the P-CSCF 516 and the S-CSCF 518. The S-CSCF 518 may forward the SIP message to the serving FCS 510.

At step 536, the serving FCS 510 may elect to determine if a handoff to a candidate MSC (e.g., based on the reported ICGI) is appropriate. The serving MSC may determine that the call should be handed off to the candidate (now target) MSC 506 and that the target MSC 506 is not already on the call path. The FCS 510 may send a facilities directive message (e.g., FACDIR) to the target MSC 506, directing the target MSC 506 to initiate a Handoff-Forward task. If the serving FCS 510 counts tandem segments, then it may increment a segment counter or the like by one (e.g., in a BillingID parameter or the like).

The target MSC 506 may prepare the target macro base station 504 for handoff (steps 538 and 540). For example, the target MSC 506 may send a Handoff Request message to the target macro base station 504, which may in turn send a Handoff Request acknowledgement message to the target MSC 506.

At step 542, the necessary facilities on the designated target system are available. Therefore, the target MSC 506 may increases a segment counter or the like (e.g., in the received BillingID parameter) by one and may use the new BillingID or the like for the new call segment, may return a facilities directive to the requesting FCS 510, and may initiate a Handoff-Forward task.

At step 544, on receipt of the facilities directive, the serving FCS 510 may send a SIP message to the S-CSCF 518 and the P-CSCF 516, wherein the SIP message may carry the Handoff Command. The P-CSCF 516 may forward the SIP message to the femto AP 520. The femto AP 520 may order the AT 502 to handoff to the macro AN, and may send a SIP message carrying a Handoff Commenced message to the P-CSCF 516 and the S-CSCF 518. The S-CSCF 518 may forward the SIP message to the FCS 510 (steps 546 and 548).

At step 550, the AT 502 is received on the designated traffic channel. The target MSC 506 completes the voice path between the traffic channel and the MSC-FCS trunk and sends a MSONCH message to the initiator of the Handoff-Forward task. The serving FCS 510 informs the requesting system that the target MSC 506 has successfully completed the Handoff-Forward task (steps 552-556).

At step 558, the serving FCS 510, on receipt of the MSONCH message, completes the handoff process by sending a SIP message carrying a Clear Command message or the like to the femto AP 520 through the S-CSCF 518 and the P-CSCF 516. The FCS-MSC trunk should be connected by this point, if it has not already been connected. At step 560, the femto AP 520 releases the resources allocated to the AT 502 that performed the handoff and sends a SIP message carrying a Clear Complete message or the like. The voice call is now in progress through the Macro AN (step S62).

Figure 6A:
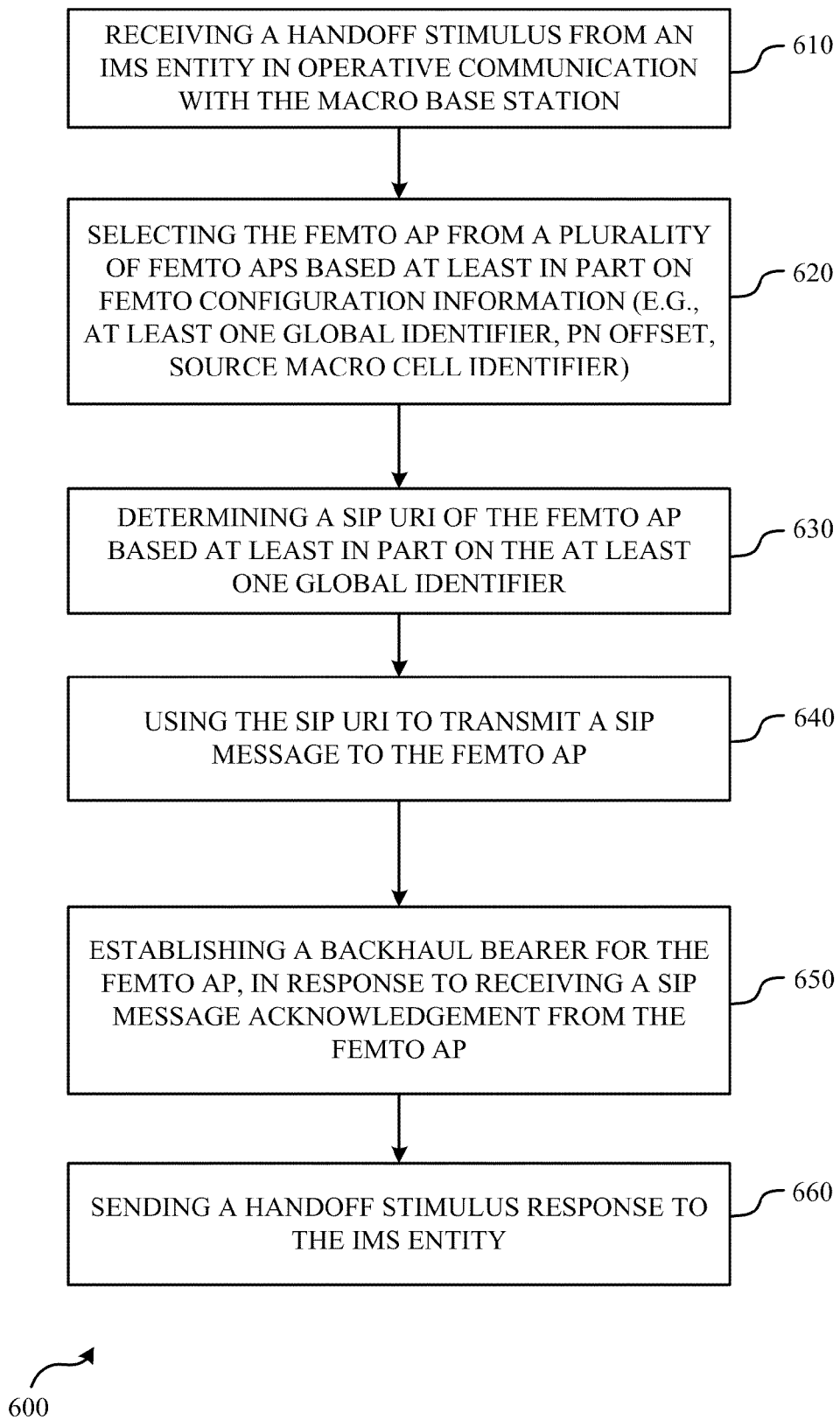
FIG. 6A shows one embodiment for a method for handing off an AT from a macro base station to a femto AP.

In accordance with one or more aspects of the embodiments described herein, there are provided methods for handing off an AT from a macro base station to a femto AP (e.g., active handoff of the AT to the femto AP). With reference to the flow diagram shown in FIG. 6A, there is provided a method 600 that may be performed at an FCS or the like. The FCS may be in operative communication with a femto management server (FMS) or other auto configuration server that configures femto AP(s). The method 600 may involve, at step 610, receiving a handoff message/stimulus (e.g., facilities directive, handoff back, and/or handoff-to-third type messages) from an Internet Protocol Multimedia Subsystem (IMS) entity in operative communication with the macro base station. For example, the handoff message may comprise femto configuration information or the like. The method 600 may involve, at step 620, selecting the femto AP from a plurality of femto APs based at least in part on the femto configuration information. For example, the femto configuration information may comprise at least one global identifier of the selected femto AP.

The method 600 may involve, at step 630, determining a SIP Uniform Resource Identifier (URI) of the femto AP based at least in part on the at least one global identifier. In the alternative, or in addition, the method 600 may involve determining the SIP URI of the femto AP based at least in part on prior updates from the femto AP or intermediate entities (e.g., a CSCF, etc.), and/or by inquiring an appropriate communication network entity that has stored such information. The method 600 may involve: using the SIP URI to transmit a SIP message to the femto AP (step 640); in response to receiving a SIP message acknowledgement from the femto AP, establishing a backhaul bearer for the femto AP (step 650); and sending a handoff message response to the IMS entity, thereby resulting in handoff of the AT to the femto AP (step 660).

Figure 6B:
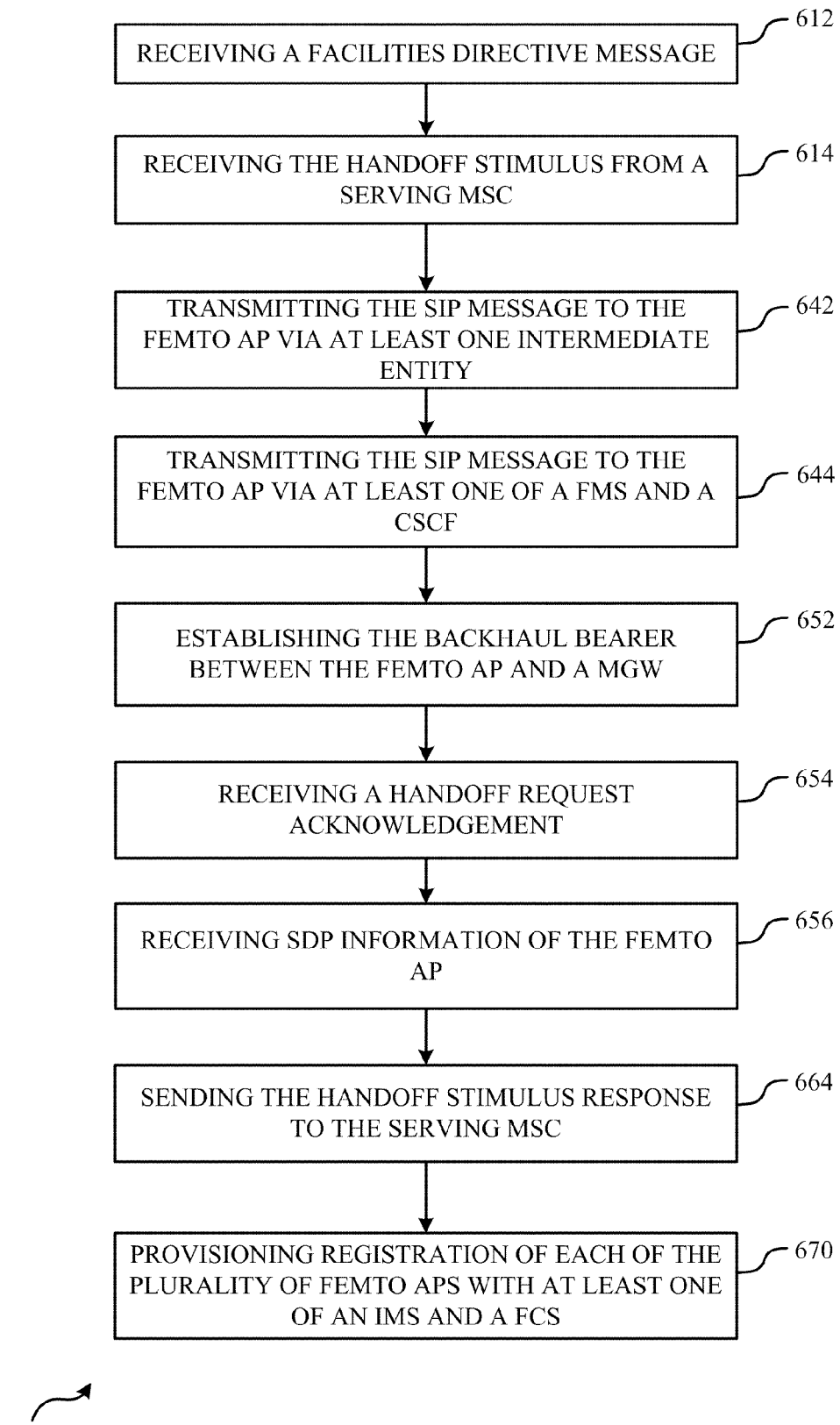
FIG. 6B shows sample aspects of the method shown in FIG. 6A.

With reference to FIG. 6B, in one embodiment, the method 600 may further comprise, at step 670, provisioning registration of each of the plurality of femto APs with at least one of an IMS and a FCS. In related aspects, step 610 may comprise receiving a facilities directive message (step 612). Step 610 may comprise receiving the handoff message from a serving MSC (step 614), and step 660 may comprise sending the handoff message response to the serving MSC (step 664).

The femto configuration information may comprise a Pseudo-Noise (PN) offset for the femto AP. In the alternative, or in addition, the femto configuration information may comprise a source macro cell identifier. The at least one global identifier of the femto AP may comprise one or more of an MSC identifier, a cell identifier, a machine-readable address, a text string, geo-location data, etc.

In further related aspects, step 640 may comprise transmitting the SIP message to the femto AP via at least one intermediate entity (step 642). Step 640 may further comprise transmitting the SIP message to the femto AP via a CSCF (step 644). In one embodiment, the SIP message may comprise a handoff request.

In yet further related aspects, step 650 may comprise establishing the backhaul bearer between the femto AP and a MGW (step 652), such as, for example, by allocating the MGW resources. Receiving the SIP message acknowledgement, in step 650, may comprise receiving a handoff request acknowledgement (step 654). In the alternative, or in addition, receiving the SIP message acknowledgement may comprise receiving SDP information of the femto AP (step 656).

Figure 7:
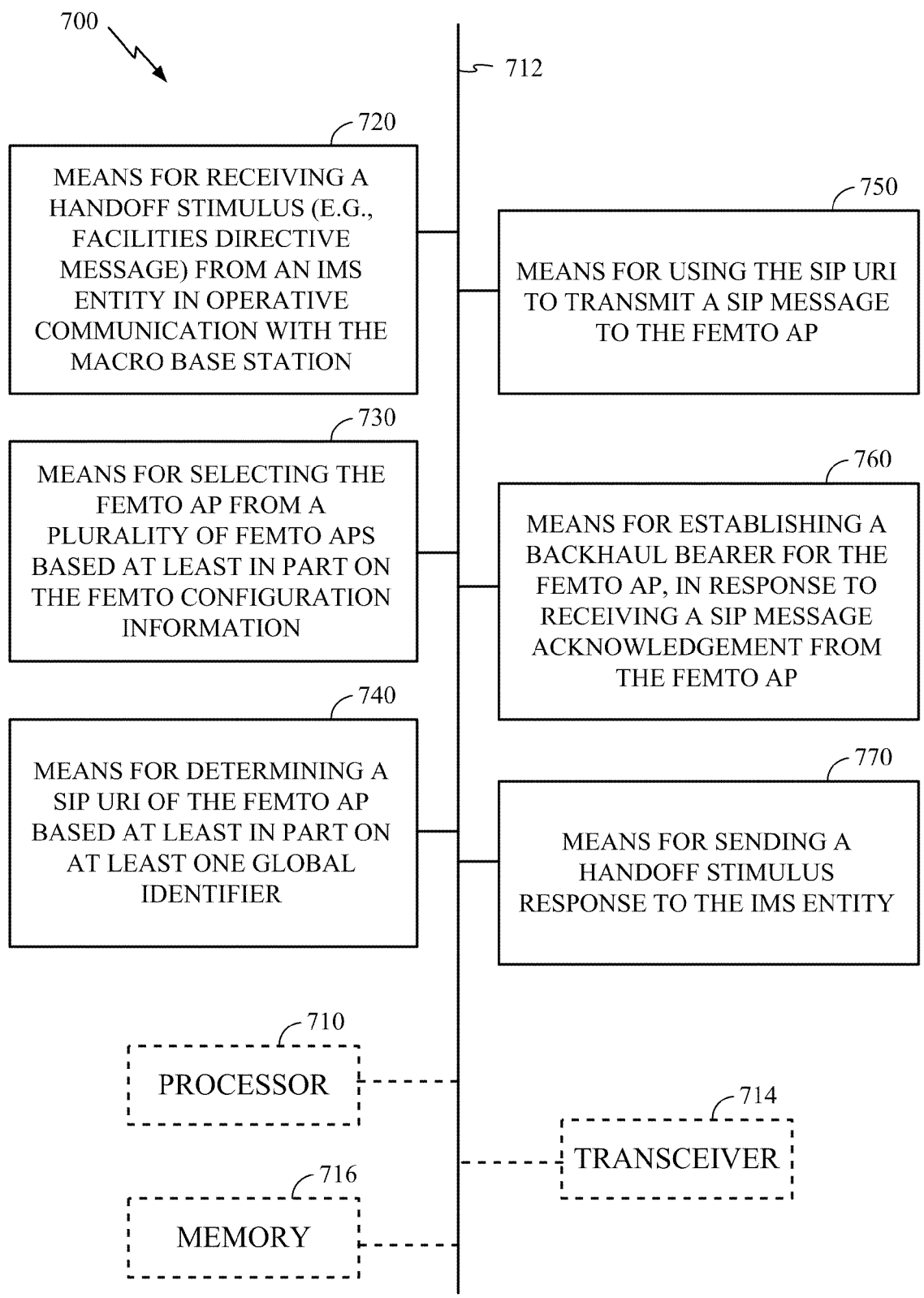
FIG. 7 illustrates one embodiment of an apparatus for handing off an AT from a macro base station to a femto AP.

In accordance with one or more aspects of the embodiments described herein, there are provided devices and apparatuses for handing off an AT from a macro base station to a femto AP. With reference to FIG. 7, there is provided an exemplary apparatus 700 that may be configured as either a communication device or communication network entity (e.g., FCS or the like), or as a processor or similar device for use within a communication device.

As illustrated, apparatus 700 may comprise a means 720 for receiving a handoff message/stimulus from an IMS entity (e.g., a serving MSC) in operative communication with the macro base station, the handoff message comprising femto configuration information (e.g., a PN offset for the femto AP, a source macro cell identifier, etc.). In related aspects, the handoff message may comprise a facilities directive message or the like.

Apparatus 700 may comprise a means 730 for selecting the femto AP from a plurality of femto APs based at least in part on the femto configuration information. The femto configuration information may comprise at least one global identifier of the selected femto AP, such as, for example, an MSC identifier (e.g., MSC_ID) and/or a cell identifier (e.g., Cell_ID) of the femto AP. In related aspects, one or more of the femto APs may be registered with an IMS and/or a FCS.

Apparatus 700 may comprise a means 740 for determining a SIP URI of the femto AP based at least in part on the at least one global identifier. Apparatus 700 may comprise a means 750 for using the SIP URI to transmit a SIP message to the femto AP (e.g., via at least one intermediate entity, such as a CSCF).

Apparatus 700 may comprise a means 760 for establishing a backhaul bearer for the femto AP, in response to receiving a SIP message acknowledgement from the femto AP. In related aspects, the backhaul bearer may be established between the femto AP and a MGW. In further related aspects, the SIP message may comprise a handoff request, and the SIP message acknowledgement may comprise a handoff request acknowledgement. In yet further related aspects, the SIP message acknowledgement may comprise SDP information of the femto AP.

Apparatus 700 may comprise a means 770 for sending a handoff message response to the IMS entity (e.g., the serving MSC), thereby resulting in handoff of the AT to the femto AP. In related aspects, the serving MSC or the like, in response to receiving the handoff message response, may send a handoff command to the macro base station which in turn sends a handoff direction message to the AT.

It is noted that apparatus 700 may optionally include a processor module 710 having at least one processor, in the case of apparatus 700 configured as a communication network entity, rather than as a processor. Processor 710, in such case, may be in operative communication with means 720-770, and components thereof, via a bus 712 or similar communication coupling. Processor 710 may effect initiation and scheduling of the processes or functions performed by means 720-770, and components thereof.

In related aspects, apparatus 700 may include a transceiver module 714 for communicating with other communication network entities, such as, for example, a serving MSC, an I-CSCF, a P-CSCF, a S-CSCF, etc. A stand alone receiver and/or stand alone transmitter may be used in lieu of or in conjunction with transceiver 714.

In further related aspects, apparatus 700 may optionally include a means for storing information, such as, for example, a memory device/module 716. Computer readable medium or memory device/module 716 may be operatively coupled to the other components of apparatus 700 via bus 712 or the like. The computer readable medium or memory device 716 may be adapted to store computer readable instructions and data for effecting the processes and behavior of means 720-770, and components thereof, or processor 710), or the methods disclosed herein.

In yet further related aspects, the memory module 716 may optionally include executable code for the processor module 710 to: (a) receive a handoff message from an IMS entity in operative communication with the macro base station, the handoff message comprising femto configuration information; (b) select the femto AP from a plurality of femto APs based at least in part on the femto configuration information, the femto configuration information comprising at least one global identifier of the selected femto AP; (c) determine a SIP URI of the femto AP based at least in part on the at least one global identifier; (d) use the SIP URI to transmit a SIP message to the femto AP; (e) in response to receiving a SIP message acknowledgement from the femto AP, establish a backhaul bearer for the femto AP; and (f) send a handoff message response to the IMS entity, resulting in handoff of the AT to the femto AP.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in Random Access Memory (RAM), flash memory, Read-Only Memory (ROM), EPROM, Electrically Erasable Programmable Read-Only Memory (EEPROM), registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes Compact Disc (CD), laser disc, optical disc, Digital Versatile Disc (DVD), floppy disk and Blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for handing off an access terminal (AT) from a macro base station to a femto access point (AP), comprising:
receiving a handoff message from an Internet Protocol multimedia subsystem (IMS) entity in operative communication with the macro base station, the handoff message comprising femto configuration information;
selecting the femto AP from a plurality of femto APs based at least in part on the femto configuration information, the femto configuration information comprising at least one global identifier of the selected femto AP;
determining a session initiation protocol (SIP) uniform resource identifier (URI) of the femto AP based at least in part on the at least one global identifier; and
using the SIP URI to transmit a SIP message to the femto AP via a call session control function (CSCF).

2. The method of claim 1, wherein receiving comprises receiving a facilities directive message.

3. The method of claim 1, further comprising, in response to receiving a SIP message acknowledgement from the femto AP, establishing a backhaul bearer for the femto AP.

4. The method of claim 3, further comprising sending a handoff message response to the IMS entity, resulting in handoff of the AT to the femto AP.

5. The method of claim 4, wherein:
receiving comprises receiving the handoff message from a serving mobile switching center (MSC); and
sending comprises sending the handoff message response to the serving MSC.

6. The method of claim 4, wherein establishing comprises establishing the backhaul bearer between the femto AP and a media gateway (MGW).

7. The method of claim 4, wherein the SIP message comprises a handoff request.

8. The method of claim 7, wherein receiving the SIP message acknowledgement comprises receiving a handoff request acknowledgement.

9. The method of claim 4, wherein receiving the SIP message acknowledgement comprises receiving session description protocol (SDP) information of the femto AP.

10. The method of claim 1, wherein the femto configuration information comprises a source macro cell identifier.

11. The method of claim 1, wherein the at least one global identifier of the femto AP comprises at least one of an MSC identifier and a cell identifier.

12. The method of claim 1, further comprising provisioning registration of each of the plurality of femto APs with at least one of an Internet Protocol multimedia subsystem (IMS) and a femto convergence server (FCS).

13. A method for handing off an access terminal (AT) from a macro base station to a femto access point (AP), comprising:
receiving a facilities directive message from a serving mobile switching center (MSC) in operative communication with the macro base station, the facilities directive message comprising femto configuration information;
selecting the femto AP from a plurality of femto APs based at least in part on the femto configuration information, the femto configuration information comprising at least one global identifier of the selected femto AP;
determining a session initiation protocol (SIP) uniform resource identifier (URI) of the femto AP based at least in part on the at least one global identifier; and
using the SIP URI to transmit a handoff request to the femto AP via a call session control function (CSCF).

14. The method of claim 13, wherein the at least one global identifier of the femto AP comprises at least one of an MSC identifier and a cell identifier.

15. The method of claim 13, further comprising, in response to receiving a handoff request acknowledgement from the femto AP, establishing a backhaul bearer between the femto AP and a media gateway (MGW).

16. The method of claim 15, further comprising sending a handoff message response to the serving MSC, resulting in handoff of the AT to the femto AP.

17. A communication device for facilitating handoff of an access terminal (AT) from a macro base station to a femto access point (AP), comprising:
a transceiver module for receiving a handoff message from an Internet Protocol multimedia subsystem (IMS) entity in operative communication with the macro base station, the handoff message comprising femto configuration information;
at least one processor operatively coupled with the transceiver module; and
a memory module operatively coupled with the at least one processor and comprising executable code for the at least one processor to:
select the femto AP from a plurality of femto APs based at least in part on the femto configuration information, the femto configuration information comprising at least one global identifier of the selected femto AP;

determine a session initiation protocol (SIP) uniform resource identifier (URI) of the femto AP based at least in part on the at least one global identifier; and use the SIP URI to transmit a SIP message to the femto AP via a call session control function (CSCF).

18. The device of claim 17, wherein the handoff message comprises a facilities directive message.

19. The device of claim 17, wherein the at least one processor, in response to receiving a SIP message acknowledgement from the femto AP, establishes a backhaul bearer for the femto AP.

20. The device of claim 19, wherein the at least one processor sends a handoff message response to the IMS entity via the transceiver module, resulting in the handoff of the AT to the femto AP.

21. The device of claim 20, wherein the at least one processor establishes the backhaul bearer between the femto AP and a media gateway (MGW).

22. The device of claim 20, wherein:
the SIP message comprises a handoff request; and
the SIP message acknowledgement comprises a handoff request acknowledgement.

23. The device of claim 20, wherein the SIP message acknowledgement comprises session description protocol (SDP) information of the femto AP.

24. The device of claim 20, wherein the IMS entity, in response to receiving the handoff message response, sends a handoff command to the macro base station which in turn sends a handoff direction message to the AT.

25. The device of claim 17, wherein the IMS entity comprises a serving mobile switching center (MSC).

26. The device of claim 17, wherein the femto configuration information comprises a source macro cell identifier.

27. The device of claim 17, wherein the at least one global identifier of the femto AP comprises at least one of an MSC identifier and a cell identifier.

28. The device of claim 17, wherein each of the plurality of femto APs are registered with at least one of an Internet Protocol multimedia subsystem (IMS) and a femto convergence server (FCS).

29. A communication device for facilitating handoff an access terminal (AT) from a macro base station to a femto access point (AP), comprising:
a transceiver module for receiving a facilities directive message from a serving mobile switching center (MSC) in operative communication with the macro base station, the facilities directive message comprising femto configuration information;
at least one processor operatively coupled with the transceiver module; and
a memory module operatively coupled with the at least one processor and comprising executable code for the at least one processor to;
select the femto AP from a plurality of femto APs based at least in part on the femto configuration information, the femto configuration information comprising at least one global identifier of the selected femto AP;
determine a session initiation protocol (SIP) uniform resource identifier (URI) of the femto AP based at least in part on the at least one global identifier; and
use the SIP URI to transmit a handoff request to the femto AP via a call session control function (CSCF).

30. The device of claim 29, wherein the at least one global identifier of the femto AP comprises at least one of an MSC identifier and a cell identifier.

31. The device of claim 29, wherein the at least one processor, in response to receiving a handoff request acknowledgement from the femto AP, establishes a backhaul bearer between the femto AP and a media gateway (MGW).

32. The device of claim 31, wherein the at least one processor sends a handoff message response to the serving MSC, resulting in handoff of the AT to the femto AP.

33. An apparatus for handing off an access terminal (AT) from a macro base station to a femto access point (AP), comprising:
means for receiving a handoff message from an Internet Protocol multimedia subsystem (IMS) entity in operative communication with the macro base station, the handoff message comprising femto configuration information;
means for selecting the femto AP from a plurality of femto APs based at least in part on the femto configuration information, the femto configuration information comprising at least one global identifier of the selected femto AP;
means for determining a session initiation protocol (SIP) uniform resource identifier (URI) of the femto AP based at least in part on the at least one global identifier; and
means for using the SIP URI to transmit a handoff request to the femto AP, wherein the SIP message comprises a handoff request via a call session control function (CSCF).

34. The apparatus of claim 33, wherein the handoff message comprises a facilities directive message.

35. The apparatus of claim 33, further comprising means for establishing a backhaul bearer for the femto AP, in response to receiving a SIP message acknowledgement from the femto AP.

36. The apparatus of claim 35, further comprising means for sending a handoff message response to the IMS entity, resulting in handoff of the AT to the femto AP.

37. The apparatus of claim 36, wherein the means for using the SIP URI comprises a means for transmitting the SIP message to the femto AP via at least one intermediate entity.

38. The apparatus of claim 36, wherein:
the SIP message comprises a handoff request; and
the SIP message acknowledgement comprises a handoff request acknowledgement.

39. The apparatus of claim 36, wherein the SIP message acknowledgement comprises session description protocol (SDP) information of the femto AP.

40. The apparatus of claim 36, wherein the IMS entity, in response to receiving the handoff message response, sends a handoff command to the macro base station which in turn sends a handoff direction message to the AT.

41. The apparatus of claim 33, wherein the IMS entity comprises a serving mobile switching center (MSC).

42. The apparatus of claim 33, wherein the femto configuration information comprises a source macro cell identifier.

43. The apparatus of claim 33, wherein the at least one global identifier of the femto AP comprises at least one of an MSC identifier and a cell identifier.

44. The apparatus of claim 33, wherein each of the plurality of femto APs are registered with at least one of an Internet Protocol multimedia subsystem (IMS) and a femto convergence server (FCS).

45. An apparatus for handing off an access terminal (AT) from a macro base station to a femto access point (AP), comprising:
means for receiving a facilities directive message from a serving mobile switching center (MSC) in operative communication with the macro base station, the facilities directive message comprising femto configuration information;

means for selecting the femto AP from a plurality of femto APs based at least in part on the femto configuration information, the femto configuration information comprising at least one global identifier of the selected femto AP;

means for determining a session initiation protocol (SIP) uniform resource identifier (URI) of the femto AP based at least in part on the at least one global identifier; and means for using the SIP URI to transmit a handoff request to the femto AP via a call session control function (CSCF).

46. The apparatus of claim 45, wherein the at least one global identifier of the femto AP comprises at least one of an MSC identifier and a cell identifier.

47. The apparatus of claim 45, further comprising means for establishing a backhaul bearer between the femto AP and a media gateway (MGW) in response to receiving a handoff request acknowledgement from the femto AP.

48. The apparatus of claim 47, further comprising means for sending a handoff message response to the serving MSC, resulting in handoff of the AT to the femto AP.

49. A computer program product, comprising a non-transitory computer-readable medium that comprises:
    code for causing at least one computer to receive a handoff message from an Internet Protocol multimedia subsystem (IMS) entity in operative communication with a macro base station, the handoff message being for a handoff of an access terminal (AT) from the macro base station to a femto access point (AP), the handoff message comprising femto configuration information;
    code for causing the at least one computer to select the femto AP from a plurality of femto APs based at least in part on the femto configuration information, the femto configuration information comprising at least one global identifier of the selected femto AP;
    code for causing the at least one computer to determine a session initiation protocol (SIP) uniform resource identifier (URI) of the femto AP based at least in part on the at least one global identifier; and
    code for causing the at least one computer to use the SIP URI to transmit a SIP message to the femto AP, wherein the SIP message comprises a handoff request via a call session control function (CSCF).

50. The computer program product of claim 49, wherein the handoff message comprises a facilities directive message.

51. The computer program product of claim 49, wherein the non-transitory computer-readable medium further comprises code for causing the at least one computer to establish a backhaul bearer for the femto AP, in response to receiving a SIP message acknowledgement from the femto AP.

52. The computer program product of claim 51, wherein the non-transitory computer-readable medium further comprises code for causing the at least one computer to send a handoff message response to the IMS entity, resulting in the handoff of the AT to the femto AP.

53. The computer program product of claim 49, wherein the IMS entity comprises a serving mobile switching center (MSC).

54. The computer program product of claim 49, wherein the femto configuration information comprises a source macro cell identifier.

55. The computer program product of claim 49, wherein the at least one global identifier of the femto AP comprises at least one of an MSC identifier and a cell identifier.

56. A computer program product, comprising a non-transitory computer-readable medium that comprises:
    code for causing at least one computer to receive a facilities directive message from a serving mobile switching center (MSC) in operative communication with a macro base station, the handoff message being for a handoff of an access terminal (AT) from the macro base station to a femto access point (AP), the facilities directive message comprising femto configuration information; and
    code for causing the at least one computer to select the femto AP from a plurality of femto APs based at least in part on the femto configuration information, the femto configuration information comprising at least one global identifier of the selected femto AP;
    code for causing the at least one computer to determine a session initiation protocol (SIP) uniform resource identifier (URI) of the femto AP based at least in part on the at least one global identifier; and
    code for causing the at least one computer to use the SIP URI to transmit a handoff request to the femto AP via a call session control function (CSCF).

57. The computer program product of claim 56, wherein the at least one global identifier of the femto AP comprises at least one of an MSC identifier and a cell identifier.

58. The computer program product of claim 56, wherein the non-transitory computer-readable medium further comprises code for causing the at least one computer to, in response to receiving a handoff request acknowledgement from the femto AP, establish a backhaul bearer between the femto AP and a media gateway (MGW).

59. The computer program product of claim 58, wherein the non-transitory computer-readable medium further comprises code for causing the at least one computer to send a handoff message response to the serving MSC, resulting in handoff of the AT to the femto AP.

60. The method of claim 1, wherein the at least one global identifier of the femto AP comprises at least two of an MSC identifier, a cell identifier, a machine-readable address, a text string, and geo-location data.

61. The method of claim 13, wherein the at least one global identifier of the femto AP comprises at least two of an MSC identifier, a cell identifier, a machine-readable address, a text string, and geo-location data.

* * * * *